March 2, 1965  E. L. STREB  3,171,241
COTTON PICKER
Filed March 17, 1961
5 Sheets-Sheet 1
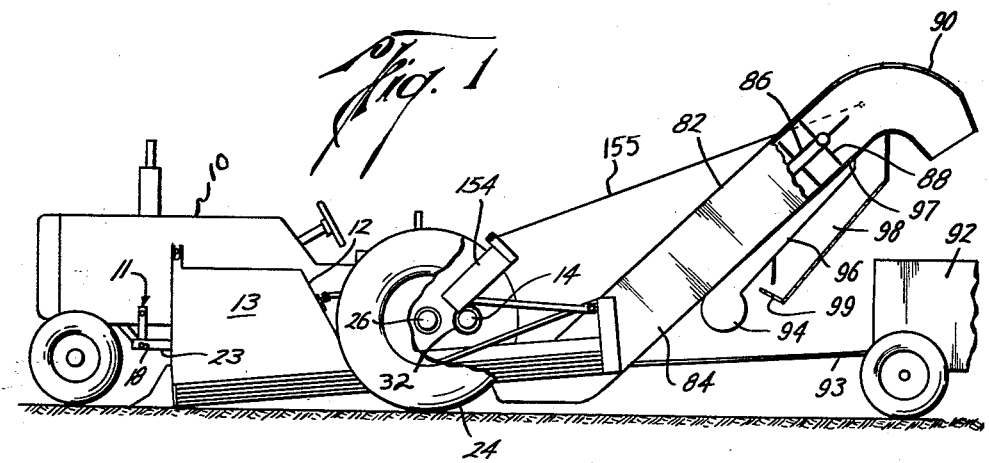
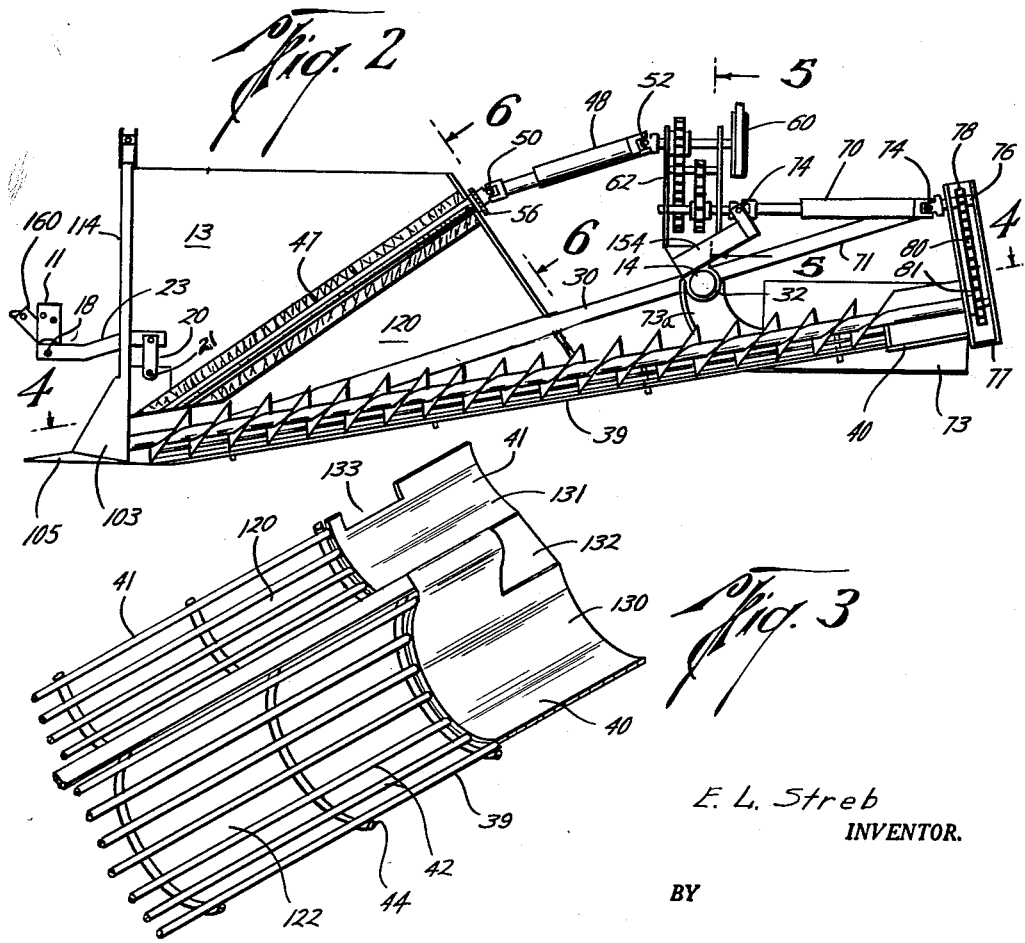
E. L. Streb
INVENTOR.
BY
ATTORNEY

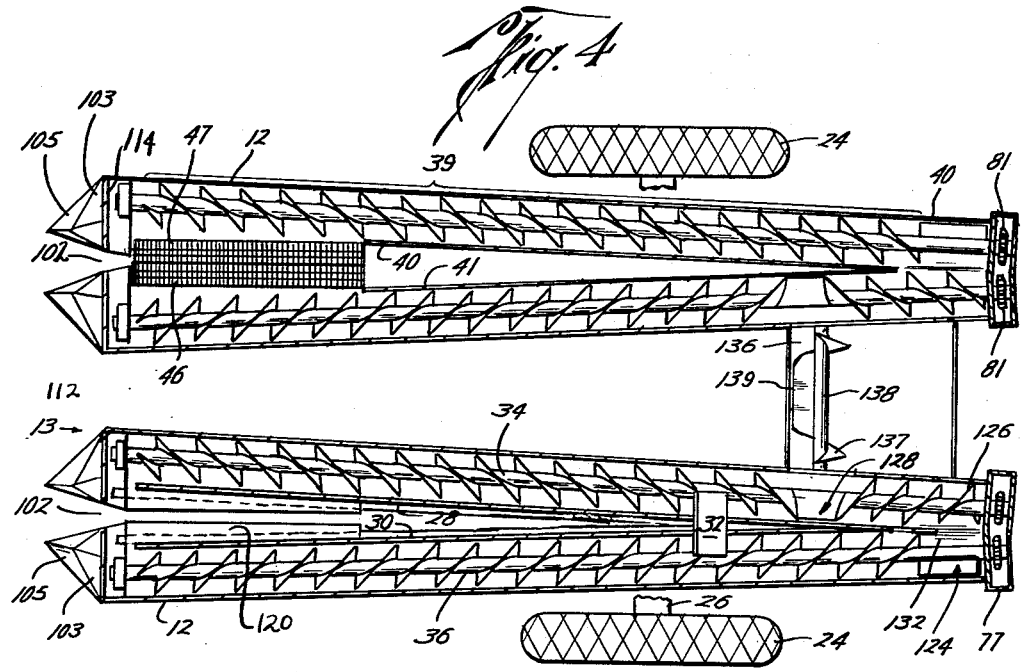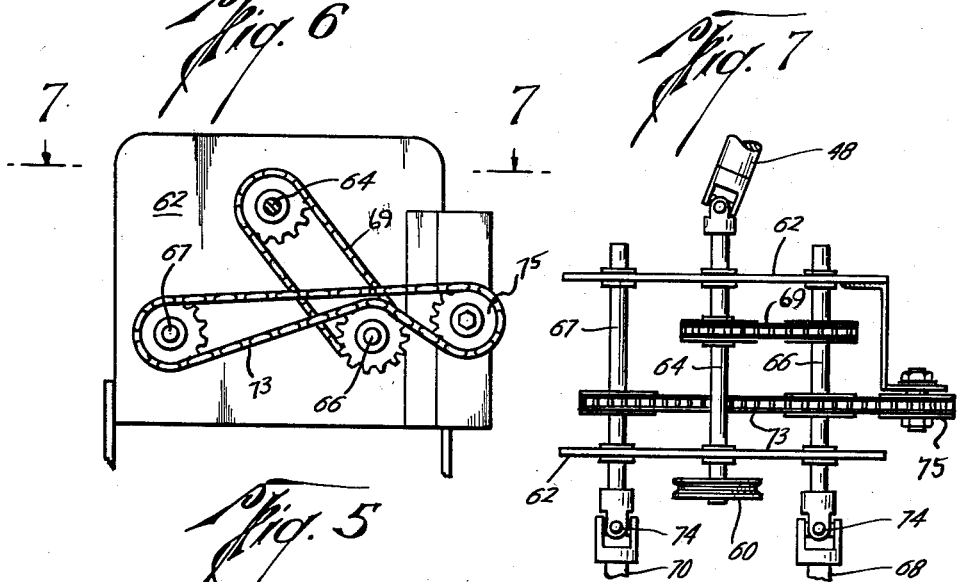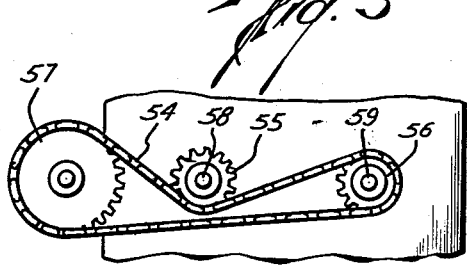

March 2, 1965  E. L. STREB  3,171,241
COTTON PICKER
Filed March 17, 1961 5 Sheets-Sheet 3
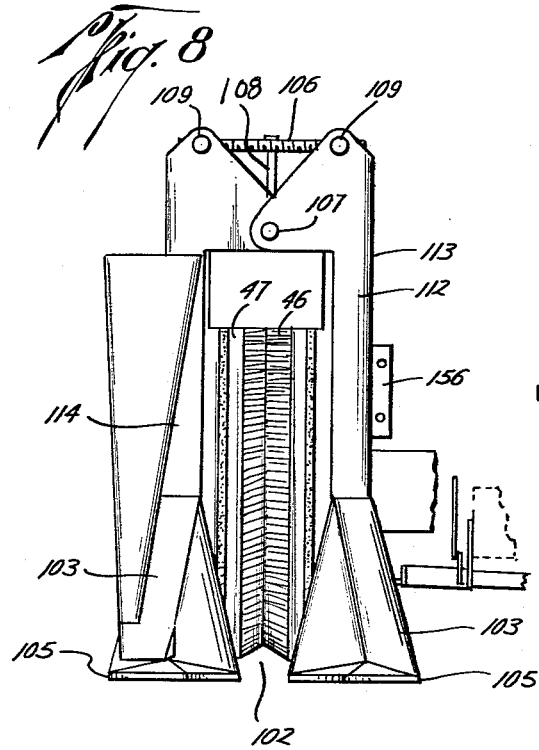
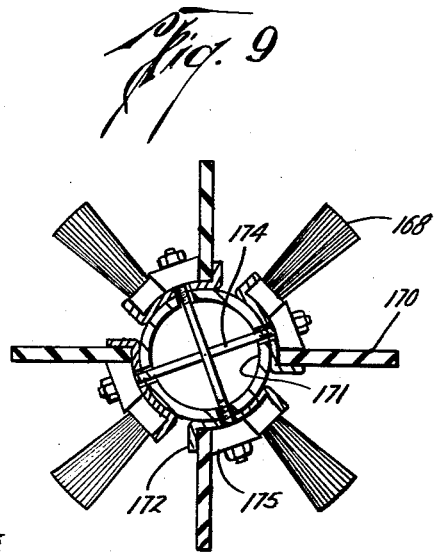
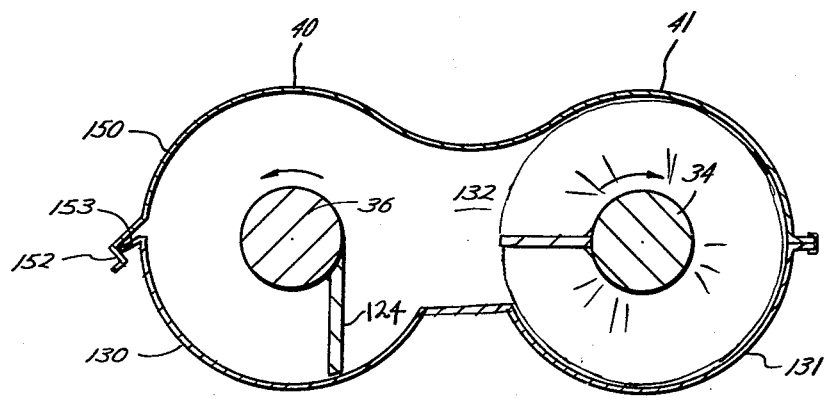
E. L. Streb
INVENTOR.
BY
ATTORNEY March 2, 1965

E. L. STREB 3,171,241

COTTON PICKER

Filed March 17, 1961

E. L. Streb
INVENTOR.

BY

ATTORNEY

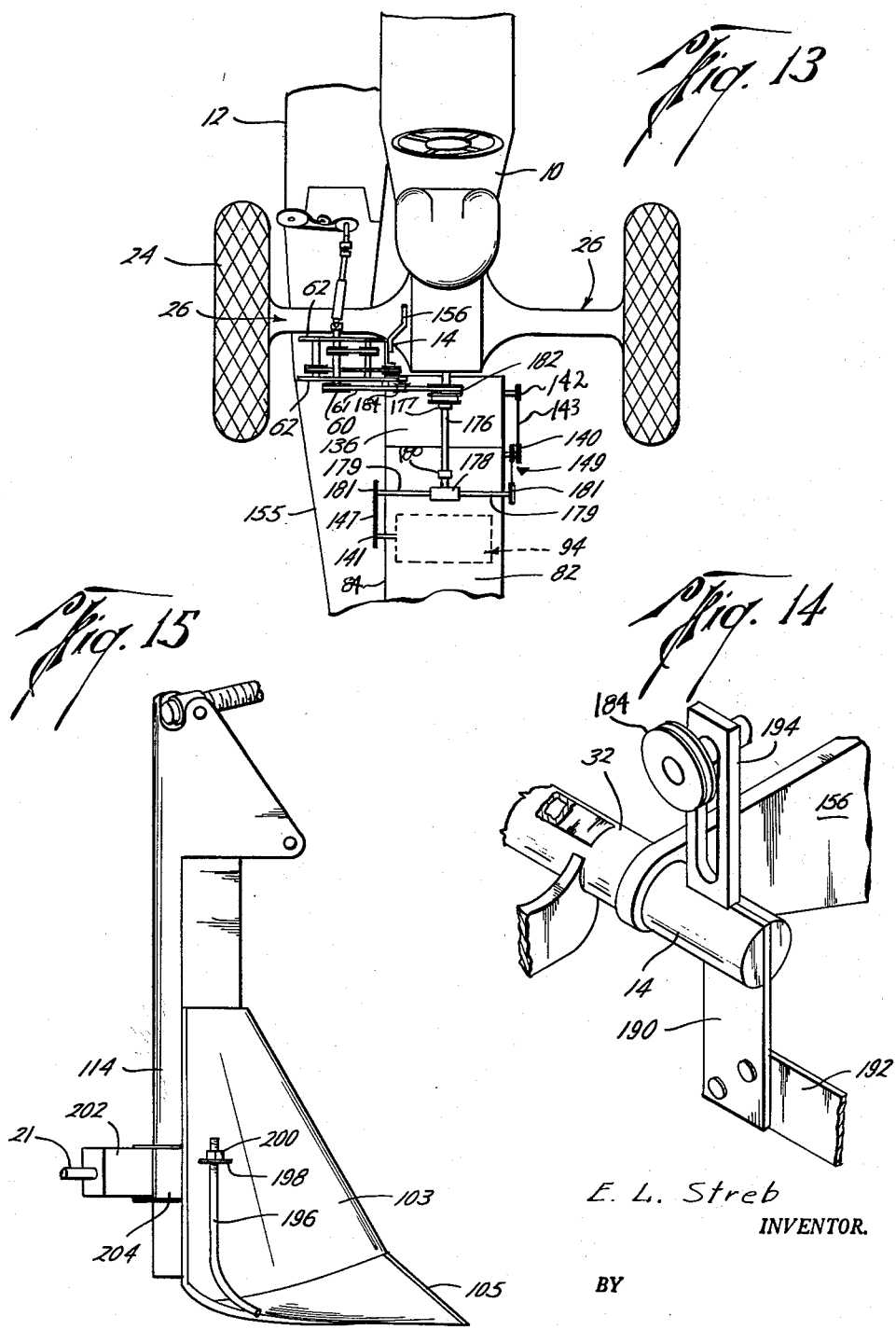

United States Patent Office 3,171,241
Patented Mar. 2, 1965

3,171,241
COTTON PICKER
Ernest L. Streb, % Frontier Equipment Co.,
Raymondville, Tex.
Filed Mar. 17, 1961, Ser. No. 96,419
5 Claims. (Cl. 56—33)

This invention pertains to a machine for picking cotton. More particularly it pertains to a demountable machine adapted to be mounted on a conventional tractor, for the purpose of removing all of the cotton lint on the cotton plant, cleaning said cotton lint and removing it into a following vehicle.

The main object of the invention is to provide a means for low cost and efficient cotton picking not available to cotton farmers at this time through conventional cotton picking machines presently available.

Another object of the invention is to provide a light weight demountable cotton picking machine which may be used to pick cotton under adverse weather conditions where the ground is wet, which object conventional machines are unable to accomplish, often resulting in a great loss to the cotton farmer.

Another object of the invention is to provide a demountable cotton picking machine which may be mounted on nearly all types of conventional tractors, now owned by nearly all cotton farmers, for picking purposes and is easily demounted when the tractor is needed for other uses.

Another object of the invention is to provide a cotton picking machine whereby the cotton lint is separated immediately from the trash and debris necessarily taken into the unit at the time the cotton is picked from the plant, avoiding the mixing thereof.

An advantage of the subject invention is that its comparatively light weight allows cotton to be picked in wet fields, under conditions wherein conventional mechanical cotton pickers cannot be used and which conditions are most often those which cause the cotton farmers the greatest loss through inability to pick the cotton. If the cotton is not picked at opportune times, it is lost to wind or rain because once having fallen on the ground, cotton lint is not recoverable. Also, exposure to continued wind and rain lowers the grade of the cotton and the price received therefor.

Another advantage of the machine is that the light trash and debris necessarily taken into the machine at the instant of picking is separated immediately from the cotton lint and does not become so inextricably entwined therewith that it cannot be removed until it reaches the gin, where the presence of such "pin trash" causes a reduction in grade and therefore price paid for the cotton lint.

Another advantage of the machine is its ability to positively transfer the cotton lint from its cleaning and transporting mechanisms to the elevators which remove the lint into the following vehicle, usually a trailer attached to the rear of the tractor.

Another advantage of the subject invention is its provision for easily removing bulky foreign material that has found its way into the machine while picking cotton, without disassembling any part of the unit and without stopping the operation of the machine for more than a few moments.

Another advantage of the invention is its ability to operate satisfactorily in a wide variety of cotton plant and stalk conditions with respect to size and moisture content of plants. Stalk moisture content sometimes renders conventional machines completely useless.

Another advantage is that the subject invention is a comparatively low cost machine having a very low price compared with conventional machines.

Other advantages are durability, low cost, and reduced "down time" for repairs.

Briefly, the invention comprises one or more demountable cotton picker units, usually used in pairs, one on either side of a conventional tractor. These units are disposed between the main body of the tractors and the outer drive wheels and are movably supported by brackets at the rear on spindles and by hydraulically operated linkages in the front to control the vertical placement of the units. Each unit basically comprises a longitudinal frame, the forward parts of which open at an acute angle towards the front to double as plant guides. The cotton is removed from the plant by closely aligned contra-rotating brush and beater rollers located at the forward end and between the front frame members and laid back from the vertical at an angle of approximately 60 degrees. As the picker unit moves down the rows, guides on the forward housing lift and direct the cotton plants into the opening leading to the brushes where the cotton is removed from the plants. The cotton and unopened bolls are discharged outwardly from each brush to a conveyor cleaner mechanism lying more or less horizontally along the outside and inside of each picker unit, leading to the rear. These conveyor units combine the conveyor function of an auger drive with the cleaning function of a longitudinal grid trough arrangement whereby the cleaning process of the cotton is begun at the moment the lint, bolls, and trash falls into the conveyor troughs. This prevents disadvantageous mixture of the cotton lint and trash. The trash falls out through the grid rods of the auger trough as the cotton is moved rearwardly. The transfer means are provided at the rear of the units for transferring the cotton lint and bolls first to the inner auger trough and thence to a collector box and then is swept into the lower part of an elevator which carries the cotton up and into a following vehicle. The transfer means on the outer auger comprises a tangential sweeping device on the rearmost part of the auger sweeping the lint into the inner auger conveyor which has on its extreme rear part reversed pitched flights for carrying the cotton forward to another tangential sweeping device which sweeps it into the aforementioned collector. The second sweeping device also disposes of cotton coming rearwardly on the inner conveyor in like manner. The collector box has a transverse shaft disposed in it having at least one auger flight on either end thereof tending to move the cotton towards the middle of the collector box and a third tangential sweeper attached to the transverse shaft which sweeps the cotton rearwardly into an elevator. The elevator is a positive lift type using flexible sweeping fingers attached to an endless belt within the elevator housing, which endless belt is driven from the tractor power take-off. The elevator uses a blower and airstream introduced at the top of the elevator to blow the lint into a following trailer and to pneumatically separate the heavy unopened bolls from the lightweight lint.

Referring now to the drawings, FIGURE 1 is a partly schematic, partly cut-away side view of the left hand unit mounted on a conventional tractor.

FIGURE 2 is a side view drawing of the same unit showing the mechanism with housing side panels removed.

FIGURE 3 is a perspective view from above of the lower part of the rear end of the auger housings of the left hand picker unit, also showing a part of the grid trough section.

FIGURE 4 is a partly schematic, partly horizontal sectional view of both right and left hand units, showing their positional relationships with each other and the tractor upon which they are mounted.

FIGURE 5 shows the chain drive arrangement for the stripper brushes at the rear of the stripper housing.

FIGURE 6 shows the drive transfer arrangement between the main drive and auger drive transfer shafts.

FIGURE 7 is a top or plan view of the main drive, auger drive transfer and brush drive means.

FIGURE 8 is a front view of the right hand picker unit, being substantially the reverse of the same view of the left hand unit.

FIGURE 9 is a cross sectional view of the stripper roller brush and beater.

FIGURE 10 is a cross sectional view of the rear part of the left hand auger conveyors and inter auger transfer means and pop-up auger housing cover to prevent jamming.

FIGURE 13 is a schematic plan view of the drive elements for transmitting power from the tractor power take-off to the picker units and the elevator mechanisms.

FIGURE 14 is a top perspective view of the horizontal spindle which supports the rear of the left hand picker unit together with portions of the frame structures attached thereto.

FIGURE 15 is a perspective view of the right hand front corner of the right hand picker unit showing the static adjustment means for the limb lifter and plant guide.

Figure 11:
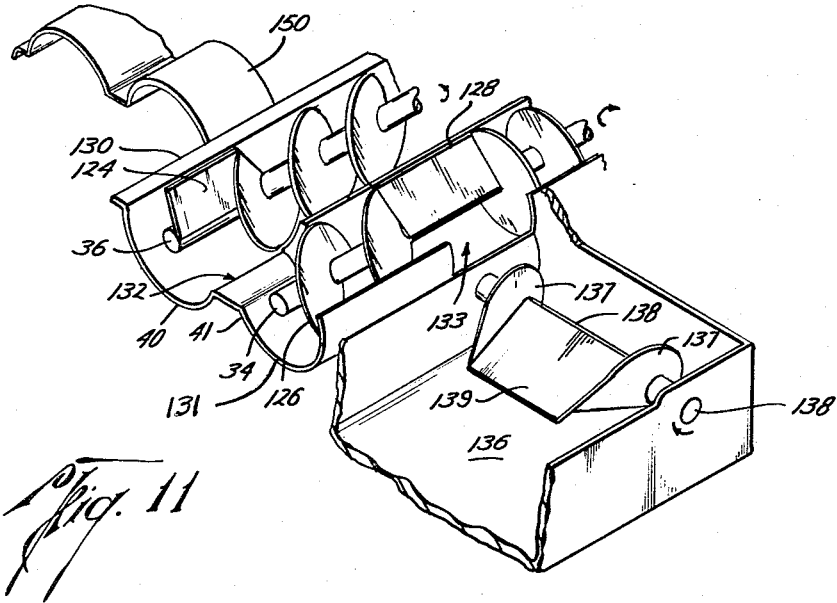
FIGURE 11 is an exploded perspective and schematic view of the rear parts of the left hand unit augers, their housing and inter-transfer means, together with the transfer means to the collector box and the collector box transfer means.

Referring now to FIGURES 1, 2 and 13, tractor 10 has cotton picker unit generally denoted 12, pivotally mounted on tractor 10, on rear horizontal mounting spindle 14, and forward horizontal spindle 18 which is fixedly bolted to tractor 10 by means of lateral vertical brackets 11. Picker unit 12 is disposed laterally of the chassis of tractor 10 between it and its outer drive wheels 24. Pivot links 20 connect link pin 21 with support arms 23. At the rear of tractor 10, disposed between the rearmost parts of picker unit 12, is an elevator generally denoted 82, comprising an elongated box-like housing 84, having an endless belt 86 with flexible finger type elevator flights 88 attached and normal thereto, and, at the upper end of housing 84 is an aimable nozzle section 90. A trailer 92 is pivotally attached to the rear of tractor 10 by tongue 93. Elevator 82 also has a blower 94 on its underside and a duct 96 carrying air to the nozzle 90. Immediately rearward of and below the opening 97 of duct 96, is boll trap 98 with an emptying door 99 in its lower end.

Referring now to FIGURES 2, 3, and 4, inner and outer longitudinal supporting members 28 and 30, respectively, of picker unit 12 extend from rotating mounting sleeve pivot 32 forward to the forward end of brush housing 13. Inner auger conveyor 34 lies between inner longitudinal support member 28 and the chassis of tractor 10, and the outer auger 36 lies between the outer longitudinal support member 30 and the inside of the left or right of tractor wheels 24 in the right and left picker units 12, respectively. Augers 34 and 36 are disposed and rotate in inner and outer grid trough portions 39 of inner and outer auger housings 40 and 41, respectively. Auger housings 40 and 41 are disposed nearly horizontally on a slightly rearward incline, and, in the plane of their longitudinal axes, converge from their spaced apart relationship at their forward ends to adjacent positions and communication therebetween by passage 132, at their rearward ends. Grid trough portions 39 of auger housings 40 and 41 comprise several longitudinally disposed, spaced apart rods 42 supported by transverse loops 44. Inner and outer contra-rotating stripper brushes 46 and 47, respectively, are disposed in the forward end of picker unit 12 and inside brush housing 13. They are rotatably mounted, generally parallel to each other, between the forward ends of augers 34 and 36. Brushes 46 and 47 are journaled through the rear wall 39 of brush housing 13 and are rotated by extensible brush drive shaft 48 having universal joints 50 and 52 at the front and rear ends, respectively.

Referring now to FIGURE 5, brush drive chain 54 engages brush drive sprockets 55 and 56 mounted on brush shafts 58 and 59, respectively, and brush idler sprocket 57.

Referring now to FIGURES 2 4, 6, 7, and 13, main drive pulley 60 is driven from the power take-off system of tractor 10 by belt 61 and is mounted on main drive support transverse channel member 62. Below and parallel to main drive sprocket shaft 64 are disposed inner and outer auger drive sprocket shafts 66 and 67, driven as shown by main auger drive chain 69 and secondary auger transfer drive chain 73, in conjunction with auger transfer idler 75, each extending through and journaled in both sides of main drive supporting channel member 62 to drive extensible inner and outer auger drive shafts 68 and 70, respectively, each of the latter incorporating two universal joints 74; each of which shafts in turn drive rear auger sprocket shafts 76 disposed within the rear auger drive support box member 77, each of which rear auger sprocket shafts 76 have sprockets 78 splined thereto. Auger drive chains 80 drive inner and outer auger 34 and 36 by means of sprockets 81 disposed on a rearmost ends of the shafts thereof. Rear upper frame member 71 and lower member 73 support box member 77.

Referring now to FIGURES 2, 4, and 8, brush housing 13 has in its forward end a cotton plant receiving opening 102 and on either side thereof, plant guides 103, their lower portions comprising movable limb lifters 105. The width of receiving opening 102, the space between brushes 46 and 47, and between frame member 28 and 30, is adjusted by means of threaded shaft 106, hinge pin 107, lock pin 108, pins 109 and the respective upper portions of inner and outer stripper housing frame facings 112 and 114, respectively, of brush housing 13. Brushes 46 and 47 are disposed at an angle of approximately 30 degrees from horizontal. Inner brush 46 is journaled in the lower end of front frame facing 112 adjacent receiving opening 102 near the attachment point of the forward end of inner longitudinal frame member 28. The lower end of outer stripper brush 47 is journaled in the lower end of frame facing 114 near its juncture with outer longitudinal member 30. Divider panels 120 are disposed between brushes 46 and 47 and the forward parts of augers 34 and 36, respectively.

Referring now to FIGURES 3, 4, 10, and 11, the rearward-most part 130 of outer auger housing 40 has passage 132 therethrough opening into the rearmost portion 131 of inner auger housing 41 which in turn has a lateral opening 133 into collector box 136 which has transverse auger shaft 138 with lateral abbreviated auger flights 137 on each end thereof, and a tangential paddle 139 on its middle portion. Tangential paddle 124 is attached to the shaft and flights of outer auger 36 at its rearmost extremity. The rearmost flights 126 of inner auger 34 having reverse pitch. Second tangential transfer paddle 128 is attached to the shaft of inner auger 34 between the forward and reverse pitched flights thereof. The rearwardmost portions of inner and outer augers 34 and 36 have closely fitted thereabout auger housings 40 and 41, respectively, the top portion of which housing comprises a hinged cover 150 which is retained by a spring lip 152 on cover 150 and flange 153 on outer auger housing 40.

Referring now to FIGURE 9, brush strips 168 and beaters 170 are attached to brush cylinder 171 by means of channel brackets 172, through-bolts 174, and wedges 175.

Figure 12:
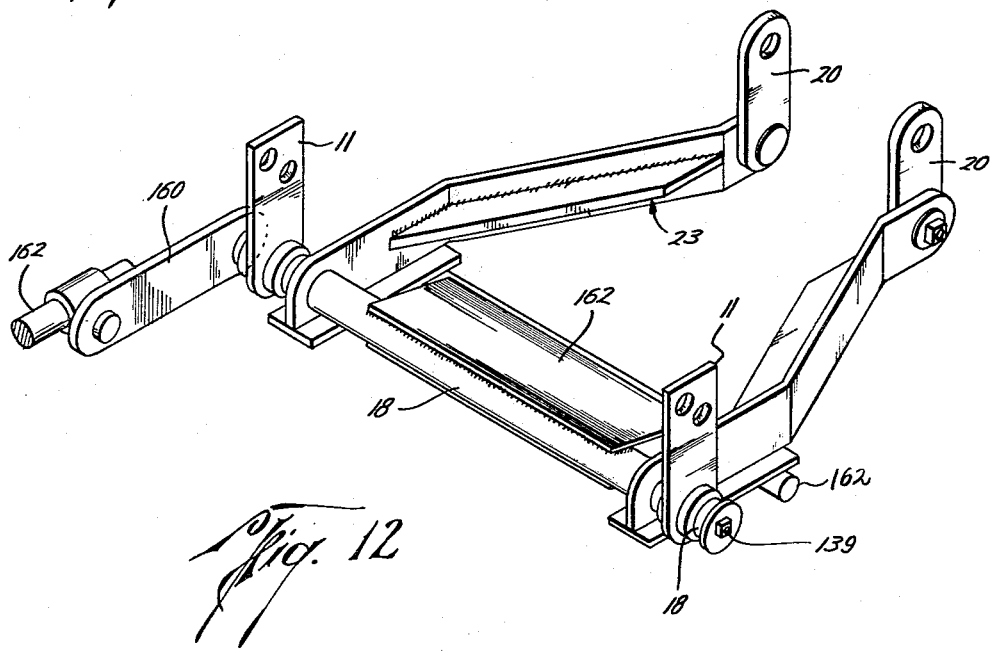
FIGURE 12 is a top perspective view of the linkage for movably mounting the front ends of the picker units.

Referring now to FIGURES 1, 2 and 12, support arms 23 are pivotally attached to transverse forward spindle 18. Actuating arm 160 is pivotally attached to hydraulic piston rod 162 which is actuated by a piston disposed within a hydraulic cylinder connected with the hydraulic system of tractor 10. Actuating arm 160 is keyed to spindle 18 which has lift stop 162 welded thereto parallel, which, when lifted, engages support arms 23. Through-bolt 159 holds support arms 23 and vertical brackets 11 on spindle 18.

Referring now to FIGURES 1, 2, 13 and 14, horizontal spindle 14 has fixedly attached to its outer end bracket 154 connecting it with front main drive support channel member 62, which bracket 154 is in turn attached to elevator brace 155, and on the inner end of horizontal spindle 14 is attached bracket 156 which is in turn attached to the inner end of tractor axle housing 26. Transverse auger shaft 138 is driven by chain 143 engaging sprocket 142. Blower 94 is driven by pulley 141 and belt 147. The power driving the collector box auger shaft is transmitted from tractor 10 by shaft 176 attached by universal joint 177 to the power take-off which shaft 176 is attached to three-way gear box 178 by universal joint 180. Lateral shafts 179 have intermediate drive pulleys 181 attached to the outer ends thereof. Main power take-off double pulley 182 drives main drive pulleys 60 on each picker unit through belts 61, each being tensioned by adjustable idlers 184.

Referring now to only FIGURE 14, rotating mounting sleeve pivot 32 is disposed around fixed horizontal spindle 14, the end of which has a downward extension 190 bolted to cross piece 192. Cross piece 192 runs under the tractor chassis to the complementary downward extension to the opposite horizontal spindle 14, thereby ridgidly tying the picker units together. Horizontal spindle 14 also is attached to tractor axle housing engaging bracket 156, vertically adjustable pulley bracket 194 is fixed to the top of horizontal spindle 14 and idler pulley 184 is adjustably attached thereto.

Referring now to FIGURE 15, limb lifter 105 has attached thereto vertical adjustment bolt 196 disposed through plate 198 which is fixedly attached to plant guide 103. Collar 200 is disposed over the end of bolt 196 and can be moved and tightened at will, thereby adjusting the height and angle of attack of limb lifter 105. Also, front support link pin 21 is attached to box section lateral support beam 202 which is adjustably disposed in close fitting hollow box section 204 which is in turn welded to frame facing 114. Inside frame facings 114 are means for locking support beam 202 in relation to hollow box section 204, all of which comprises means for laterally adjusting the width between the forward end of the unit and support arms 23 and thereby adjusting the width between the forward ends of the left and right-hand picker units 12.

In operation, tractor 10, carrying picking units 12 between the main chassis of tractor 10 and drive wheels 24 suspended on rear support spindle 14 and forward support spindle 18, moves down the cotton rows. Limb lifter 105 engages the lowest part of the cotton plant first, lifts the limbs slightly and the whole plant is engaged by plant guides 103 and, as units 12 move forward, the plant moves into plant opening 102 between forward frame facings 112 and 114 of stripper brush housing 13 where it is engaged by contra-rotating brushes and beaters 46 and 47. The brushes remove the cotton, unopened bolls, and some debris from the plant. The cotton plant, thus stripped of its cotton, unopened and partially opened bolls, moves rearwardly between inner and outer forward frame members 28 and 30, respectively, which also serve as interior plant or stalk guides. The cotton removed by brushes 46 and 47 fall into inner and outer auger conveyors 34 and 36, respectively, which cotton and bolls, and debris are initially confined inside stripper brush housing 13 and guided by deflector panels 120. The cotton is then moved rearwardly by auger conveyors 34 and 36, disposed in auger housings 40 and 41, respectively, the bottom half of each of auger housings 40 and 41 comprising grid trough portions 39 for the greater part of their length. As the cotton is moved rearwardly by augers 24 and 36, the cotton is rotated and agitated, allowing the debris to fall out between grid rods 42. The cotton and bolls moved by the outer auger moves to its rearmost extremity where there it is transferred by a tangential sweeping paddle 124 through housing opening 132 into the rearmost part 131 of the inner auger conveyor housing 41. At this point, the auger housings 40 and 41 are interconnected by a passage 132 therebetween and the top covers of the rearmost parts of the auger housings 40 and 41 comprise a single, resiliently retained by lip 152 and flange 153, so that hinged flap 150 which, when tumbleweeds or other types of bulky foreign material has been taken into the machine, it pushes up flap 150 and allows the difficulty to be noticed and remedied. The rearmost end of the inner auger 34 has reverse flights 126 moving the cotton transferred from the outer auger 36 forward to another tangential sweeping paddle 128. The cotton falling on the forward end of inner auger 34 is also moved rearwardly over grid section 39 of inner auger housing 41 where the debris is shaken from the cotton and falls between grid rods 42. When the cotton moved on inner auger 34 reaches tangential sweeping paddle 128 it is transferred, along with the cotton from the outer auger, into collector box 136 through opening 133 in inner auger housing 41 where it is moved by abbreviated flights 137 attached to transverse auger 138 towards the middle of collector box 136 where it is swept rearwardly by a third tangential sweeping paddle 139 rearwardly into elevator box 84 where it is picked up by upwardly moving flexible fingers 88, attached normal to endless belt 86, to the top of the elevator 82 where the airstream from blower 94 coming up through the air duct 96 strikes the cotton and moves it on out to the directional nozzle 90 and unopened bolls, being heavier, fall out of the airstream into boll trap 98 from which they are eventually removed through the trap door 99 at the bottom of boll trap 98. Both picker units 12 are basically the same, however, being arranged in right and left hand, or mirror image, configurations. Both picker units 12 are pivotally mounted at their rear on horizontal mandrels 14, the inner ends of which rear support mandrels 14 are connected by cross piece 192 attached to lower extension 190 on each of such horizontal rear support mandrels 14. The power to drive brushes 46 and 47, and augers 34 and 36 is transmitted from tractor 10 by means of belts 61 disposed on double power take-off pulley 182 splined to the power take-off on the rear of tractor 10. Main drive pulleys 60 are on each unit and drive belts 61 are tensioned by vertically adjustable idlers 184 on vertical pulley bracket 194 on tangential mandrel 14 on both units. The power is transmitted from main drive pulleys 60 through main drive sprocket shaft 64 and brush drive shaft 48 which in turn drives brush sprockets 55 and 56 by means of chain 54 and idler 57 in opposite directions. By means of inner and outer auger transfer sprocket shafts 66 and 67, chains 69 and 73, and rear auger sprocket drive shafts 76, and final auger drive chains and sprockets 80 and 81, respectively, power is transmitted to auger drive shafts 34 and 36. Rear auger drive sprockets 78 are disposed on near auger sprocket drive shafts 76 which are mounted in rear box section 77. Rear box section 77 is supported by rearwardly extending rear lower brace 73(a) and upper brace 71 both of which are fixedly attached to rotatable sleeve 32 which is mounted on horizontal mandrel 14. Elevator blower 94, endless belt 86 and collector box auger shaft 138 are driven through three-way gear box 178 and side shafts 179 having pulleys 181 on the end thereof, belts 147 and 149, and chain 143 to the drive sprocket 142 on the end of collector box auger shaft 138. Power reaches a three-way gear box 178 by means of shaft 176 having universal joints 177 and 180 on either end thereof, one attached to said three-way gear box and the other to the end of the power take-off shaft on tractor 10.

Braces 155 attached to the elevator box 84 and outer brackets 154 of support mandrel 14 support the elevator in such way that it may be moved forward. A trailer 92 is towed behind tractor 10 by tongue 93 to receive the cotton picked by the unit 12.

While the invention herein disclosed and described comprises a preferred embodiment of the invention, it is also understood that the numerous modifications, alterations, adaptations and substitutions may be made of, on and to the invention without departing from the spirit thereof and that such arrangements, alterations, adaptations and substitutions falling within the scope of the following claims are intended to be included and covered by the following claims.

What is claimed is:

1. In a mobile cotton harvester:
   a cotton collector box;
   an elongated, generally horizontal, inner trough mounted alongside and substantially horizontally aligned with said collector box, extending fore and aft of the harvester and having an outlet opening intermediate its ends discharging laterally into the collector box;
   an elongated, generally horizontal, outer trough mounted alongside said inner trough and having an outlet passage adjacent its rearmost end discharging laterally into the inner trough, said collector box being at substantially the same level as the normally rearmost portions of the troughs;
   a first screw conveyor rotatable in said outer trough, coextensive in length therewith and having auger flighting for moving cotton along the outer trough rearwardly thereof toward said passage;
   first paddle means mounted on said first conveyor for rotation therewith at said passage for feeding cotton from the outer trough into the inner trough through said passage;
   a second screw conveyor rotatable in said inner trough coextensive in length therewith and having auger flighting between said passage and said opening for moving cotton emanating from the passage forwardly of the inner trough toward said opening, said second conveyor having auger flighting forwardly of the opening for moving cotton along the inner trough rearwardly thereof toward said opening; and
   second paddle means mounted on the second conveyor for rotation therewith at said opening between the flightings of the second conveyor for feeding cotton from the inner trough substantially horizontally into the collector box through said outlet opening.

2. The invention of claim 1 wherein said inner trough is provided with an edge defining the lowermost extremity of said opening and located above the bottom of the inner trough, and wherein is included means coupled with the second conveyor for rotating the second paddle means in a direction away from said edge toward said bottom whereby to raise the cotton over the axis of the second conveyor as the cotton is fed through said opening into the receiver.

3. The invention of claim 1 wherein is included elevator structure extending upwardly from said collector box and mounted for removing cotton therefrom and conveying the same to a point above the level of the collector box.

4. The invention of claim 3 wherein is provided a vehicle supporting the harvester and provided with a pair of spaced ground wheels having an axle therebetween, there being means mounting the troughs on the vehicle between the wheels and beneath said axle, and means on the vehicle supporting said elevator structure.

5. The invention of claim 1 wherein is provided an inner and an outer trough having the defined conveyors and paddles therein, on each of opposed sides of the collector box for simultaneous, substantially horizontal discharge of cotton from respective inner troughs through the outlet openings therein directly into the collector box.

References Cited in the file of this patent

UNITED STATES PATENTS

| | | |
|---|---|---|
| 2,406,058 | Boone | Aug. 20, 1946 |
| 2,571,224 | Edwards | Oct. 16, 1951 |
| 2,654,201 | Hyman | Oct. 6, 1953 |
| 2,660,849 | Knowles | Dec. 1, 1953 |
| 2,825,195 | Smith | Mar. 4, 1958 |
| 2,836,027 | Pearson | May 27, 1958 |
| 2,903,835 | Kappelmann | Sept. 15, 1959 |